US011866005B2

(12) United States Patent
Hasegawa et al.

(10) Patent No.: US 11,866,005 B2
(45) Date of Patent: Jan. 9, 2024

(54) VEHICLE CONTROL APPARATUS, VEHICLE CONTROL METHOD, RECORDING MEDIUM WITH PROGRAM FOR CONTROL RECORDED, AND VEHICLE CONTROL SYSTEM

(71) Applicant: HONDA MOTOR CO., LTD., Tokyo (JP)

(72) Inventors: Satoshi Hasegawa, Wako (JP); Seonghun Lee, Wako (JP); Katsuyasu Yamane, Wako (JP); Fumiaki Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 512 days.

(21) Appl. No.: 17/117,529

(22) Filed: Dec. 10, 2020

(65) Prior Publication Data

US 2021/0179020 A1 Jun. 17, 2021

(30) Foreign Application Priority Data

Dec. 17, 2019 (JP) ................................. 2019-227114

(51) Int. Cl.
*G01S 5/00* (2006.01)
*B60R 25/24* (2013.01)
(Continued)

(52) U.S. Cl.
CPC ............ *B60R 25/245* (2013.01); *G07C 5/008* (2013.01); *H04W 4/023* (2013.01); *B60R 25/01* (2013.01);
(Continued)

(58) Field of Classification Search
CPC . G01S 5/00; G01S 13/84; E05B 49/00; B60R 25/24; B60R 25/245; B60R 25/209; G07C 5/008
See application file for complete search history.

(56) References Cited

U.S. PATENT DOCUMENTS 11,270,533 B2 * 3/2022 Ahmed ................ H04B 17/318
11,538,331 B2 * 12/2022 Varughese ............ H04W 76/11
(Continued)

FOREIGN PATENT DOCUMENTS

| JP | 2007-146501 | 6/2007 |
| JP | 2014-054902 | 3/2014 |
| JP | 2019-528387 | 10/2019 |

OTHER PUBLICATIONS

Chinese Office Action dated Sep. 27, 2022 issued in corresponding Chinese application No. 202011463824; English machine translation included (28 pages).

(Continued)

*Primary Examiner* — Tan Q Nguyen
(74) *Attorney, Agent, or Firm* — Rankin, Hill & Clark LLP (57) ABSTRACT

A vehicle control apparatus includes a first vehicle communication unit performing communication with a mobile terminal, a first distance measuring unit measuring, with first precision, a vehicle-terminal distance being a distance between a vehicle and the mobile terminal, a terminal position information obtaining unit obtaining terminal position information transmitted from the mobile terminal, a second distance measuring unit measuring the vehicle-terminal distance with second precision being measurement precision lower than the first precision based on the terminal position information, and a high-precision distance measurement determining unit determining whether the first distance measuring unit is caused to measure the vehicle-terminal (Continued)

distance or not based on the vehicle-terminal distance measured by the second distance measuring unit.

8 Claims, 4 Drawing Sheets

(51) Int. Cl.
  *G07C 5/00* (2006.01)
  *H04W 4/02* (2018.01)
  *E05B 49/00* (2006.01)
  *B60R 25/01* (2013.01)
  *B60R 25/20* (2013.01)

(52) U.S. Cl.
  CPC ....... *B60R 25/209* (2013.01); *B60R 2325/101* (2013.01); *B60R 2325/207* (2013.01)

(56) References Cited

U.S. PATENT DOCUMENTS

| | | | |
|---|---|---|---|
| 11,548,517 B2* | 1/2023 | Golsch | H04L 67/306 |
| 11,630,194 B2* | 4/2023 | Osai | G08C 17/02 |
| | | | 701/2 |
| 11,663,864 B2* | 5/2023 | Kincaid | H04W 4/021 |
| | | | 340/5.31 |
| 2016/0171803 A1* | 6/2016 | Müller | B60R 25/2072 |
| | | | 340/5.61 |
| 2017/0236351 A1* | 8/2017 | Menard | G01S 13/0209 |
| | | | 340/5.61 |
| 2018/0099643 A1* | 4/2018 | Golsch | G01S 13/765 |

OTHER PUBLICATIONS

Japanese Office Action dated Feb. 1, 2022, English abstract included, 13 pages.

* cited by examiner

VEHICLE CONTROL APPARATUS, VEHICLE CONTROL METHOD, RECORDING MEDIUM WITH PROGRAM FOR CONTROL RECORDED, AND VEHICLE CONTROL SYSTEM

INCORPORATION BY REFERENCE

The present application claims priority under 35 U.S.C. § 119 to Japanese Patent Application No. 2019-227114 filed on Dec. 17, 2019. The content of the application is incorporated herein by reference in its entirety.

BACKGROUND OF THE INVENTION

Field of the Invention

The present invention relates to a vehicle control apparatus, a vehicle control method, a recording medium with program for control recorded, and a vehicle control system.

Description of the Related Art

Conventionally, a vehicle control system has been proposed that includes a security device and an interior reader/writer in a vehicle and thus enables operations on the vehicle by using a vehicle key and a mobile terminal such as a smartphone (see Japanese Patent Laid-Open No. 2014-54902, for example). In the vehicle control system, the security device permits locking/unlocking of a door with a vehicle key if authentication of the vehicle key is succeeded within a communication area outside of the vehicle. The security device further permits to start an engine of the vehicle with the vehicle key if the authentication of the vehicle key is succeeded within a communication area within the vehicle.

The interior reader/writer permits operations on the vehicle (such as locking/unlocking of a door and start of the engine) with a mobile terminal carried onto the vehicle if authentication via near field communication (NFC) with the mobile terminal is succeeded.

Although the operations on a vehicle with a mobile terminal are enabled when the mobile terminal is carried onto the vehicle in the conventional vehicle control system, enabling operations on the vehicle from outside of the vehicle with the mobile terminal like a vehicle key is also desired. With respect to a vehicle key, operations on a vehicle with the vehicle key can be permitted based on a distance between the vehicle and the vehicle key measured with relatively low power consumption achieved by a combination of low-frequency (LF) and ultra-high frequency (UHF). Therefore, also in order to enable operations on a vehicle from outside of the vehicle with a mobile terminal, enabling measurement of a distance between the vehicle and the mobile terminal with reduced power consumption is desirable.

The present invention has been made in view of such background, and it is an object of the present invention to provide a vehicle control apparatus, a vehicle control method, a recording medium with program for control recorded, and a vehicle control system that enable measurement of a distance between a vehicle and a mobile terminal with reduced power consumption and with high precision.

SUMMARY OF THE INVENTION

As a first aspect for achieving the object, there is provided a vehicle control apparatus including a vehicle communication control unit performing communication by a first communication specification with a mobile terminal used by a user of a vehicle when the mobile terminal positions within an out-vehicle communication area within a predetermined distance from the vehicle, a first distance measuring unit measuring a vehicle-terminal distance with first precision, the vehicle-terminal distance being a distance between the vehicle and the mobile terminal, a vehicle position information obtaining unit obtaining vehicle position information including current position information on the vehicle, a terminal position information obtaining unit obtaining terminal position information including current position information on the mobile terminal transmitted from the mobile terminal by the first communication specification by receiving the terminal position information from the mobile terminal through the vehicle communication control unit, a second distance measuring unit measuring the vehicle-terminal distance with second precision based on the vehicle position information and the terminal position information, the second precision being measurement precision lower than the first precision, and a high-precision distance measurement determining unit determining whether the first distance measuring unit is caused to measure the vehicle-terminal distance or not based on the vehicle-terminal distance measured by the second distance measuring unit.

In the vehicle control apparatus, the high-precision distance measurement determining unit may determine to cause the first distance measuring unit to measure the vehicle-terminal distance when the vehicle-terminal distance decreases by a predetermined distance or larger in a plurality of the vehicle-terminal distances measured at different points in time by the second distance measuring unit.

The vehicle control apparatus may further include a battery remaining-amount recognizing unit recognizing a remaining amount of a battery included in the vehicle. In this case, the high-precision distance measurement determining unit may determine not to cause the first distance measuring unit to measure the vehicle-terminal distance when the remaining amount of the battery recognized by the battery remaining-amount recognizing unit is equal to or lower than a predetermined remaining amount even though the vehicle-terminal distance decreases by a predetermined distance or larger in a plurality of the vehicle-terminal distances measured at different points in time by the second distance measuring unit.

The vehicle control apparatus may further include an electronic-key-app operation recognizing unit recognizing that an electronic key app for remotely operating the vehicle with the mobile terminal is in operation based on operating state information on the mobile terminal transmitted from the mobile terminal to the vehicle communication control unit. In this case, the high-precision distance measurement determining unit may determine to cause the first distance measuring unit to measure the vehicle-terminal distance when the electronic-key-app operation recognizing unit recognizes that the electronic key app is in operation even though the vehicle-terminal distance does not decrease by a predetermined distance or larger in a plurality of the vehicle-terminal distances measured at different points in time by the second distance measuring unit.

In the vehicle control apparatus, the terminal position information may include current position information on the mobile terminal detected by a terminal global positioning system (GPS) sensor provided in the mobile terminal, the vehicle position information may include current position information on the vehicle detected by a vehicle GPS sensor provided in the vehicle, the second distance measuring unit may measure the vehicle-terminal distance with the second precision based on a current position of the vehicle detected by the vehicle GPS sensor and recognized from the vehicle position information and the terminal position information detected by the terminal GPS sensor and recognized from the terminal position information, and the first distance measuring unit may measure the vehicle-terminal distance with the first precision by performing, by the vehicle communication control unit, communication with the mobile terminal by a second communication specification involving larger power consumption for communication than the first communication specification.

In the vehicle control apparatus, the first communication specification may be a communication specification by Bluetooth Low Energy (BLE where Bluetooth is a registered trademark), and the second communication specification is a communication specification by Ultra Wide Band (UWB).

As a second aspect for achieving the object, there is provided a vehicle control method to be executed by a vehicle control apparatus performing communication with a mobile terminal used by a user of a vehicle, the method including a vehicle communication control step of performing communication by a first communication specification with the mobile terminal when the mobile terminal positions within an out-vehicle communication area within a predetermined distance from the vehicle, a first distance measuring step of measuring a vehicle-terminal distance with first precision, the vehicle-terminal distance being a distance between the vehicle and the mobile terminal, a vehicle position information obtaining step of obtaining vehicle position information including current position information on the vehicle, a terminal position information obtaining step of obtaining terminal position information including current position information on the mobile terminal transmitted from the mobile terminal by the first communication specification by receiving the terminal position information from the mobile terminal through processing in the vehicle communication control step, a second distance measuring step of measuring the vehicle-terminal distance with second precision based on the vehicle position information and the terminal position information, the second precision being measurement precision lower than the first precision, and a high-precision distance measurement determining step of determining whether the first distance measuring step is caused to measure the vehicle-terminal distance or not based on the vehicle-terminal distance measured in the second distance measuring step.

As a third aspect for achieving the object, there is provided a recording medium with a program for control recorded, the program being executed by a vehicle control apparatus performing communication with a mobile terminal used by a user of a vehicle and causing the vehicle control apparatus to function as a vehicle communication control unit performing communication by a first communication specification with the mobile terminal when the mobile terminal positions within an out-vehicle communication area within a predetermined distance from the vehicle, a first distance measuring unit measuring a vehicle-terminal distance with first precision, the vehicle-terminal distance being a distance between the vehicle and the mobile terminal, a vehicle position information obtaining unit obtaining vehicle position information including current position information on the vehicle, a terminal, position information obtaining unit obtaining terminal position information including current position information on the mobile terminal transmitted from the mobile terminal by the first communication specification by receiving the terminal position information from the mobile terminal through the vehicle communication control unit, a second distance measuring unit measuring the vehicle-terminal distance with second precision based on the vehicle position information and the terminal position information, the second precision being measurement precision lower than the first precision, and a high-precision distance measurement determining unit determining whether the first distance measuring unit is caused to measure the vehicle-terminal distance or not based on the vehicle-terminal distance measured by the second distance measuring unit.

As a fourth aspect for achieving the object, there is provided a vehicle control system including a vehicle control apparatus having a vehicle communication control unit and a mobile terminal used by a user of a vehicle. In this case, the vehicle communication control unit and the mobile terminal perform communication by a first communication specification by establishing communication with each other when the mobile terminal positions within an out-vehicle communication area within a predetermined distance from the vehicle, and the vehicle control apparatus includes a first distance measuring unit measuring a vehicle-terminal distance with first precision, the vehicle-terminal distance being a distance between the vehicle and the mobile terminal, a vehicle position information obtaining unit obtaining vehicle position information including current position information on the vehicle, a terminal position information obtaining unit obtaining terminal position information including current position information on the mobile terminal transmitted from the mobile terminal by the first communication specification by receiving the terminal position information from the mobile terminal through the vehicle communication control unit, a second distance measuring unit measuring the vehicle-terminal distance with second precision based on the vehicle position information and the terminal position information, the second precision being measurement precision lower than the first precision, and a high-precision distance measurement determining unit determining whether the first distance measuring unit is caused to measure the vehicle-terminal distance or not based on the vehicle-terminal distance measured by the second distance measuring unit.

Advantageous Effect of Invention

According to the above-described vehicle control apparatus, when the mobile terminal is within an out-vehicle communication area and communication is performed by the first communication specification between the mobile terminal and the vehicle communication control unit, a vehicle-terminal distance is measured, by the second distance measuring unit, with low precision based on terminal position information transmitted from the mobile terminal. The high-precision distance measurement determining unit determines whether the first distance measuring unit is caused to measure the vehicle-terminal distance with first precision being high precision based on the vehicle-terminal distance measured by the second distance measuring unit. Thus, the power consumption required for measurement of the vehicle-terminal distance can be reduced more than a case where the vehicle-terminal distance is unconditionally measured with the high precision by the first distance measuring unit when the mobile terminal positions within the out-vehicle communication area.

DETAILED DESCRIPTION OF THE PREFERRED EMBODIMENT

1. Measurement of Distance Between Vehicle and Mobile Terminal by Vehicle Control Apparatus With reference to FIG. 1, an aspect is described in which a distance (hereinafter, "vehicle-terminal distance") M between a vehicle 100 and a mobile terminal 10 is measured in a vehicle control system 1 of an embodiment. The vehicle control system 1 includes a vehicle control apparatus 110 mounted on the vehicle 100 and the mobile terminal 10 to be used by a user U of the vehicle 200. The vehicle control apparatus 110 is an electronic control unit (ECU) that includes a central processing unit (CPU), a memory, an interface circuit and so on, not shown, and controls operations of the vehicle 100.

Figure 1:
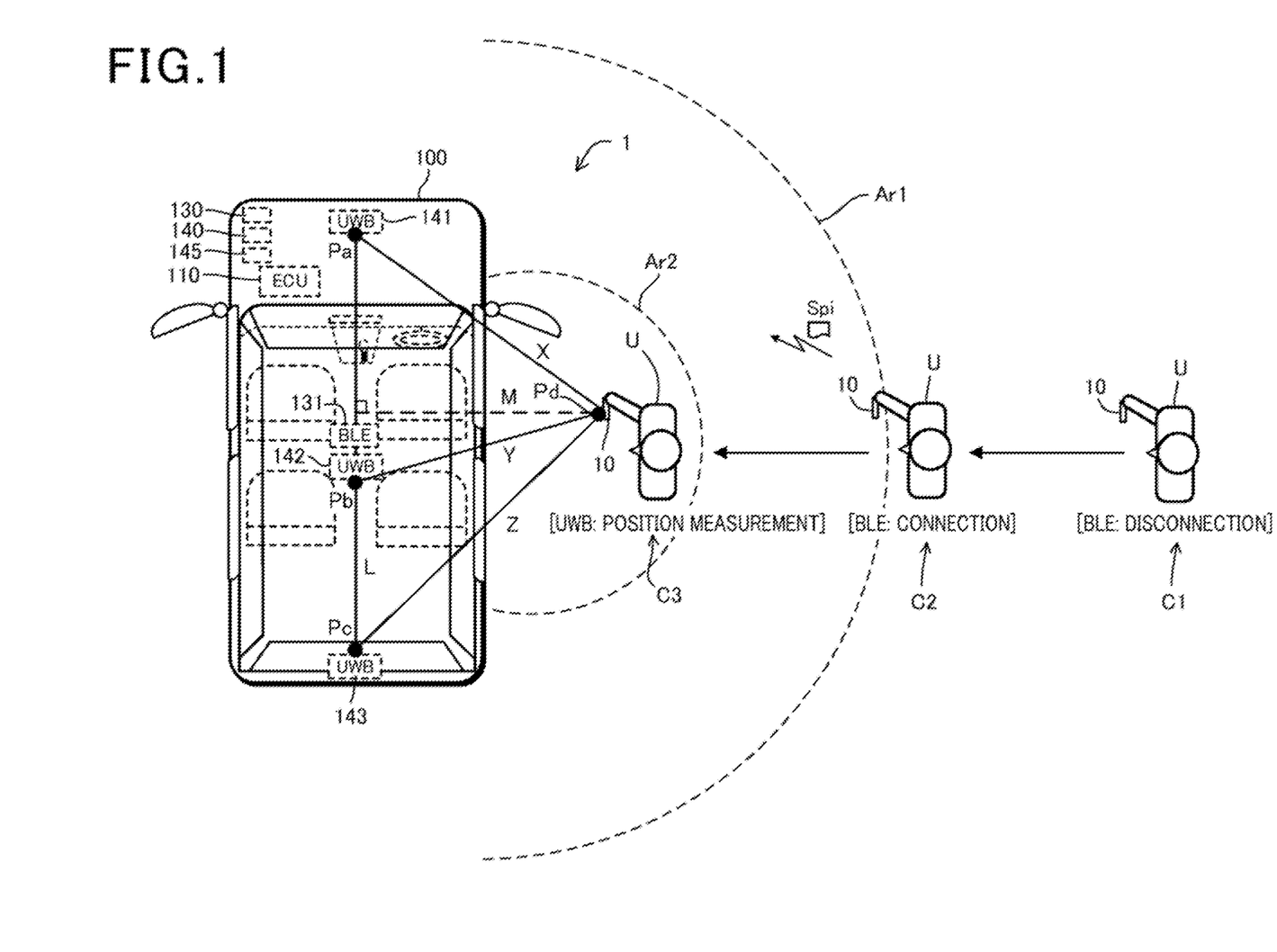
FIG. 1 is an explanatory diagram of an aspect in which a distance between a vehicle and a mobile terminal is measured by a vehicle control system.

In order to permit a remote operation on the vehicle 100 by the mobile terminal 10, the vehicle control apparatus 110 measures the vehicle-terminal distance M by performing communication with the mobile terminal 10. The mobile terminal 10 is, for example, a smartphone, a mobile phone, a tablet terminal, or a wearable device such as a smart watch and is carried or worn by the user U for use.

An electronic key application (app) is installed in the mobile terminal 10, and the mobile terminal 10 can function as an electronic key including a function that remotely operates the vehicle 100 by executing the electronic key app. The vehicle 100 and the mobile terminal 10 mutually perform communication by communication specifications of Bluetooth Low Energy (BLE where Bluetooth is a registered trademark) and Ultra Wide Band (UWB). In UWB communication, a bandwidth of 500 MHz to ten-odd GHz (such as around an 8 GHz band) is used.

The vehicle 100 includes a first vehicle communication unit 130 performing communication by BLE, a second vehicle communication unit 140 performing communication by UWB, and a vehicle global positioning system (GPS) sensor 145 receiving radio waves transmitted from a GPS satellite and detecting a current position (latitude, longitude) of the vehicle 100. The communication specification by BLE corresponds to a first communication specification of the present invention. The communication specification by UWB corresponds to a second communication specification of the present invention.

The vehicle 100 has a BLE antenna 131 connected to the first vehicle communication unit 130 and UWB antennas 141, 142 and 143 connected to the second vehicle communication unit 140. The BLE antenna 131 is arranged substantially in a center part of the vehicle 100. The UWB antenna 141 is arranged in a front part of the vehicle 100, the UWB antenna 142 is arranged in the center part, and the UWB antenna 143 is arranged in a rear part of the vehicle 100.

The vehicle control apparatus 110 performs polling by BLE communication through the first vehicle communication unit 130, and, when the mobile terminal 10 enters from outside (the state indicated by C1) to inside (the state indicated by C2) of an out-vehicle communication area Ar1 of BLE communication by the first vehicle communication unit 130, establishes communication by BLE with the mobile terminal 10.

The vehicle control apparatus 110 confirms that the mobile terminal 10 is registered as an electronic key of the vehicle 100 by performing authentication of the electronic key between the vehicle control apparatus 110 and the mobile terminal 10. More specifically, the vehicle control apparatus 110 confirms that the mobile terminal 10 is registered as an electronic key of the vehicle 100 by comparing an authentication code transmitted from the mobile terminal 10 and an authentication code saved in the memory of the vehicle control apparatus 110.

The vehicle control apparatus 110 measures the vehicle-terminal distance M in order to permit use of the mobile terminal 10 as an electronic key. The vehicle control apparatus 110 performs UWB communication through the second vehicle communication unit 140 with the mobile terminal 10 and measures a distance X between the UWB antenna 141 and the mobile terminal 10, a distance Y between the UWB antenna 142 and the mobile terminal 10, and a distance Z between the UWB antenna 143 and the mobile terminal 10 based on Time of Flight (ToF). Because a position Pa of the UWB antenna 141, a position Pb of the UWB antenna 142 and a position Pc of the UWB antenna 143 in the vehicle 100 are known, a relative position Pd of the mobile terminal 10 with respect to the vehicle 100 is calculated by trilateration by measuring X, Y and Z, and the vehicle-terminal distance M can thus be measured with first precision being high precision.

While communication by BLE is being established between the first vehicle communication unit 130 and the mobile terminal 10, the vehicle control apparatus 110 performs UWB communication between the second vehicle communication unit 140 and the mobile terminal 10 and measures the vehicle-terminal distance M with the first precision. When the vehicle control apparatus 110 recognizes from the vehicle-terminal distance M measured by UWB communication that the mobile terminal 10 has entered a monitoring area Ar2 near the vehicle 100, the vehicle control apparatus 110 permits use of the mobile terminal 10 as the electronic key.

Thus, the user U can unlock and lock a door of the vehicle 100, open and close an electric door (such as a power slide door, a power hinge door or a power tail gate), start the engine, turn on/off an air conditioner, and cause a buzzer to go off, for example, by operating the mobile terminal 10. When the vehicle control apparatus 110 recognizes that the mobile terminal 10 has entered the monitoring area Ar2, the vehicle control apparatus 110 performs processing for, for example, putting on a welcome light (not shown) included in the vehicle 100.

The mobile terminal 10 further includes a terminal GPS sensor 20 (see FIG. 2), and the mobile terminal 10 transmits to the vehicle 100 terminal position information Spi including current position information on the mobile terminal 10 detected by the terminal GPS sensor 20. Based on the terminal position information Spi received through the first vehicle communication unit 130 and the current position of the vehicle 100 detected by the vehicle GPS sensor 145, the vehicle control apparatus 110 measures the vehicle-terminal distance M with second precision lower than the first precision.

Limitedly when the vehicle control apparatus 110 recognizes that the mobile terminal 10 is approaching the vehicle 100 from time-series data of the vehicle-terminal distance M measured with the second precision, the vehicle control apparatus 110 measures the vehicle-terminal distance M with the first precision by performing UWB communication. Here, power consumption required for the BLE communication is lower than power consumption required for UWB communication. Thus, the power consumption required for measurement of the vehicle-terminal distance M with the first precision can be reduced more than a case where the vehicle-terminal distances M are measured with the first precision by unconditionally performing UWB communication between the vehicle 100 and the mobile terminal 10 when the mobile terminal 10 positions within the out-vehicle communication area Ar1 of the first vehicle communication unit 330.

2. Configurations of Vehicle and Mobile Terminal

Figure 2:
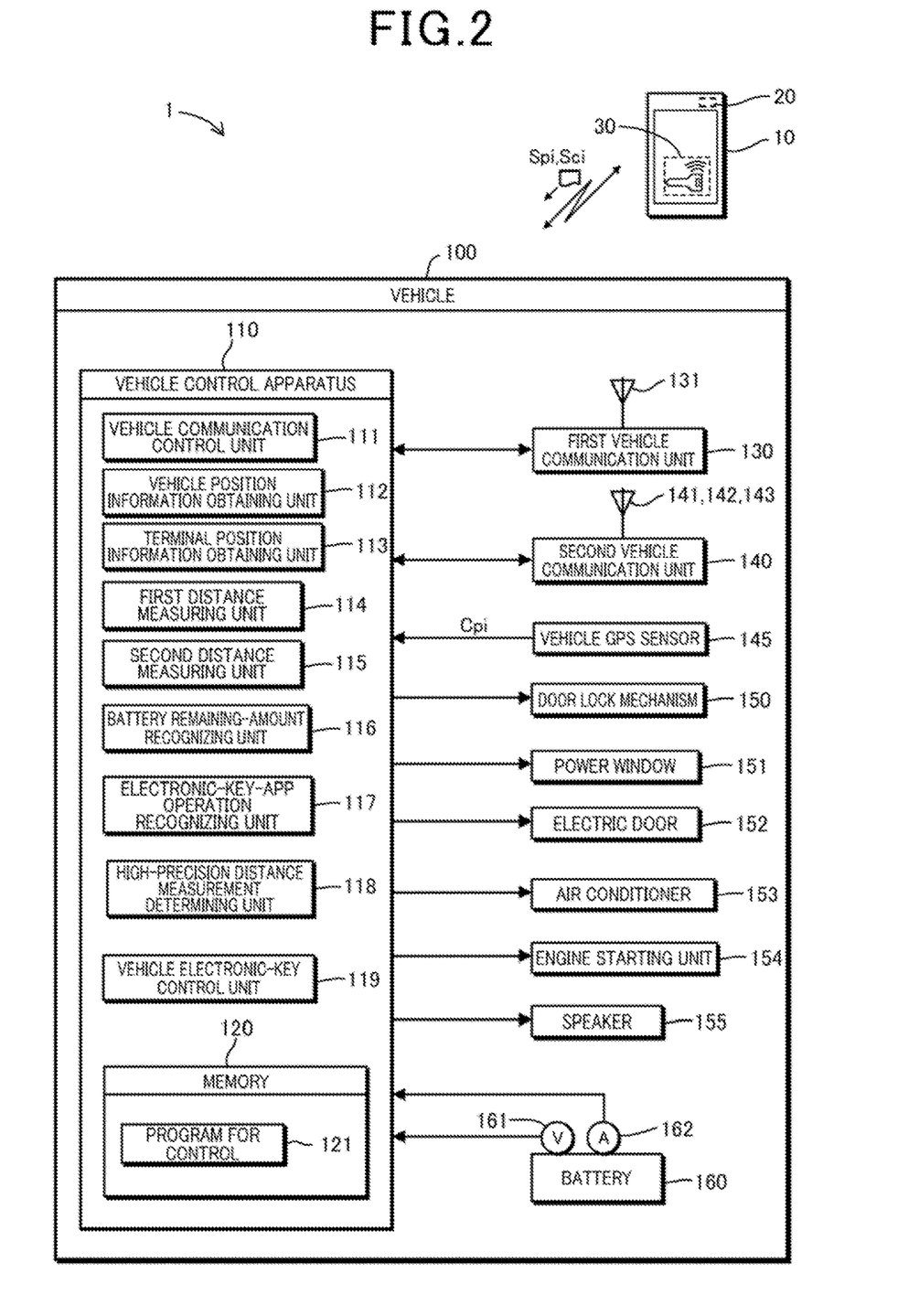
FIG. 2 is an explanatory diagram of configurations of a vehicle on which a vehicle control apparatus is mounted and a mobile terminal.

With reference to FIG. 2, configurations of the vehicle 100 on which the vehicle control apparatus 110 is mounted and the mobile terminal 10 are described. The vehicle 100 includes, in addition to the vehicle control apparatus 110, the first vehicle communication unit 130, the second vehicle communication unit 140 and the vehicle GPS sensor 145 described above, a door lock mechanism 150, a power window 151, an electric door 152 (such as a power slide door, a power hinge door or a power tail gate), an air conditioner 153, an engine starting unit 154, a speaker 155, and a battery 160.

The battery 160 provides power supply to the vehicle control apparatus 110, the first vehicle communication unit 130, the second vehicle communication unit 140, the vehicle GPS sensor 145 and so on. The battery 160 has a voltage sensor 161 that detects inter-terminal voltage in the battery 160 and a current sensor 162 that detects input and output currents of the battery 160.

The mobile terminal 10 includes a terminal GPS sensor 20 that detects a current position of the mobile terminal 10 and functions as an electronic key of the vehicle 100 by executing the electronic key app 30. The mobile terminal 10 transmits to the vehicle 100 the terminal position information Spi including current position information of the mobile terminal 10 detected by the GPS sensor 20 and operating state information Sci including execution information on the electronic key app 30.

The CPU (not shown) included in the vehicle control apparatus 110 reads and executes a program for control 121 for the vehicle 100 saved in the memory 120 (recording medium) to function as a vehicle communication control unit 111, a vehicle position information obtaining unit 112, a terminal position information obtaining unit 113, a first distance measuring unit 114, a second distance measuring unit 115, a battery remaining-amount recognizing unit 116, an electronic-key-app operation recognizing unit 117, a high-precision distance measurement determining unit 118, and a vehicle electronic-key control unit 119. The program for control 121 may be recorded in an external recording medium (flash memory, magnetic disk, optical disk or the like), and transferred from the external recording medium to the memory 120.

Processing to be executed by the vehicle communication control unit 111 corresponds to a vehicle communication control step in a vehicle control method of the present Invention, and processing to be executed by the first distance measuring unit 114 corresponds to a first distance measuring step in the vehicle control method of the present invention. Processing to be executed by the vehicle position information obtaining unit 112 corresponds to a vehicle position information obtaining step in the vehicle control method of the present invention, and processing to be executed by the terminal position information obtaining unit 113 corresponds to a terminal position information obtaining step in the vehicle control method of the present invention. Processing to be executed by the second distance measuring unit 115 corresponds to a second distance measuring step in the vehicle control method of the present invention, and processing to be executed by the high-precision distance measurement determining unit 118 corresponds to a high-precision distance measurement determining step in the vehicle control method of the present invention.

The vehicle communication control unit 111 performs control over BLE communication through the first vehicle communication unit 130 and performs control over UWB communication through the second vehicle communication unit 140. The vehicle position information obtaining unit 112 obtains vehicle position information Cpi including current position information on the vehicle 100 detected by the GPS sensor 145. The terminal position information obtaining unit 113 obtains the terminal position information Spi transmitted from the mobile terminal 10. The first distance measuring unit 114 measures the vehicle-terminal distance M with the first precision by performing UWB communication with the mobile terminal 10 through the second vehicle communication unit 140 as described above with reference to FIG. 1.

The second distance measuring unit 115 measures the vehicle-terminal distance M with the second precision that is a measurement precision lower than the first precision based on the current position of the vehicle 100 detected by the vehicle GPS sensor 145 and recognized from the vehicle position information Cpi and the current position of the mobile terminal 10 detected by the terminal GPS sensor 20 and recognized from the terminal position information Spi. The battery remaining-amount recognizing unit 116 recognizes the remaining amount (residual accumulated electrical quantity) of the battery 160 based on the integrated quantity of input and output currents of the battery 160 detected by the current sensor 162, output voltage of the battery 160 detected by the voltage sensor 161 and so on.

The electronic-key-app operation recognizing unit 117 recognizes that the electronic key app 30 is in operation in the mobile terminal 10 from the operating state information Sci transmitted from the mobile terminal 10. The high-precision distance measurement determining unit 118 determines whether the first distance measuring unit 114 is caused to measure the vehicle-terminal distance M with the first precision or not to permit use of the mobile terminal 10 as the electronic key by confirming the satisfaction of the following first to third conditions.

First condition: The vehicle-terminal distance M decreases by a predetermined distance or larger in a plurality of vehicle-terminal distances M measured with the second precision at different points in time by the second distance measuring unit 115. If the vehicle-terminal distance M decreases by a predetermined distance or larger, it is presumed that the user U carrying the mobile terminal 10 is approaching the vehicle 100 for using the vehicle 100. Thus, if the first condition is satisfied, the high-precision distance measurement determining unit 118 determines to cause the first distance measuring unit 114 to measure the vehicle-terminal distance M.

Second condition: The remaining amount of the battery 160 recognized by the battery remaining-amount recognizing unit 116 is equal to or lower than a predetermined remaining amount. If the remaining amount of the battery 160 is equal to or lower than the predetermined remaining amount, reduction of the consumption of the battery 160 is required. For that, if the second condition is satisfied, the high-precision distance measurement determining unit 118 determines not to cause the first distance measuring unit 114 to measure the vehicle-terminal distance M.

Third condition: It is recognized by the electronic-key-app operation recognizing unit 117 that the electronic key app 30 is in operation in the mobile terminal 10. If the third condition is satisfied, it may be considered that the user U has started the electronic key app 30 for using the vehicle 100. Therefore, if the third condition is satisfied, the high-precision distance measurement determining unit 118 determines to cause the first distance measuring unit 114 to measure the vehicle-terminal distance M.

3. Distance Measurement Processing on Distance Between Vehicle and Terminal

Figure 3:
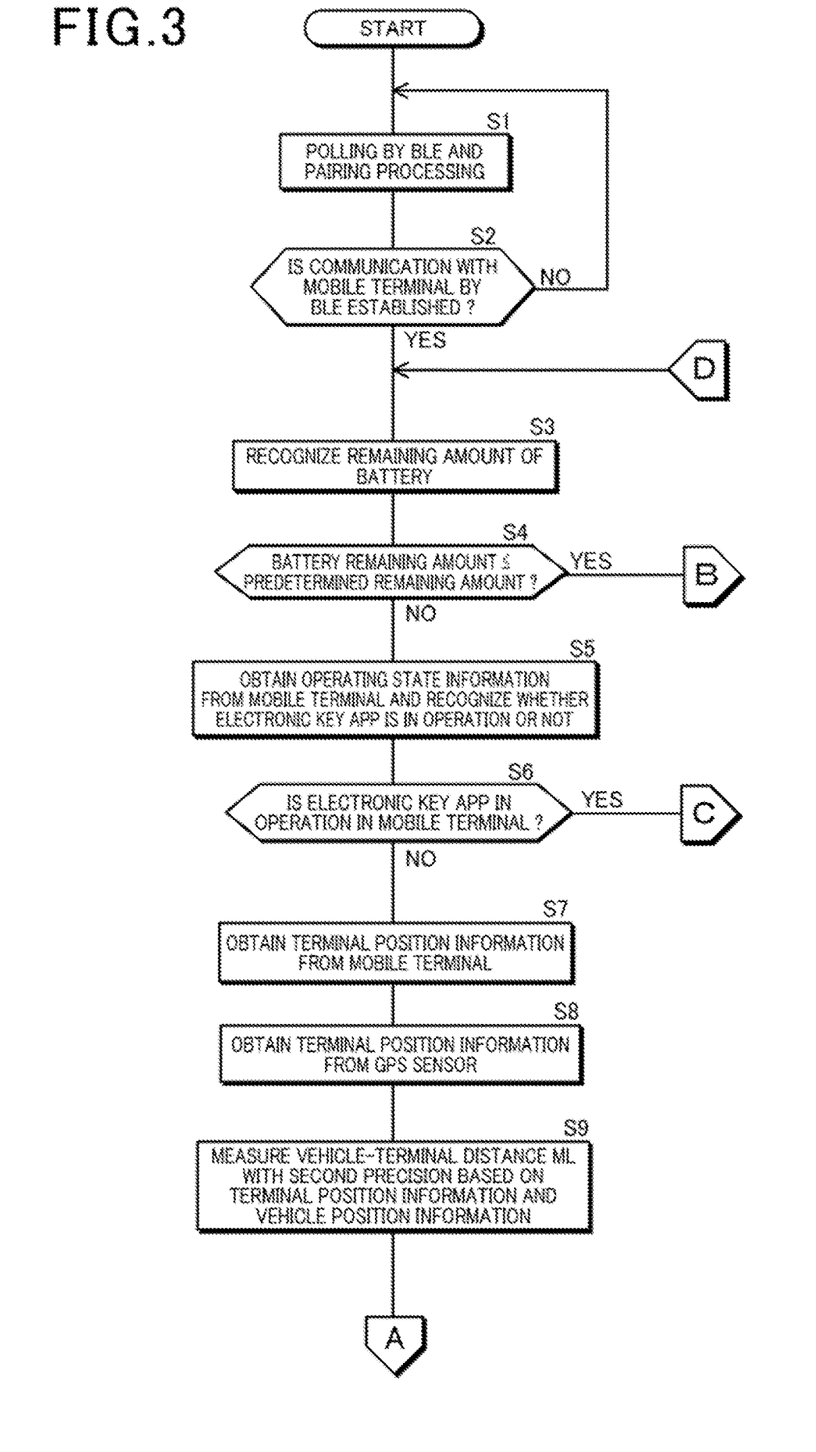
FIG. 3 is a first flowchart of distance measurement processing between the vehicle and the mobile terminal.
Figure 4:
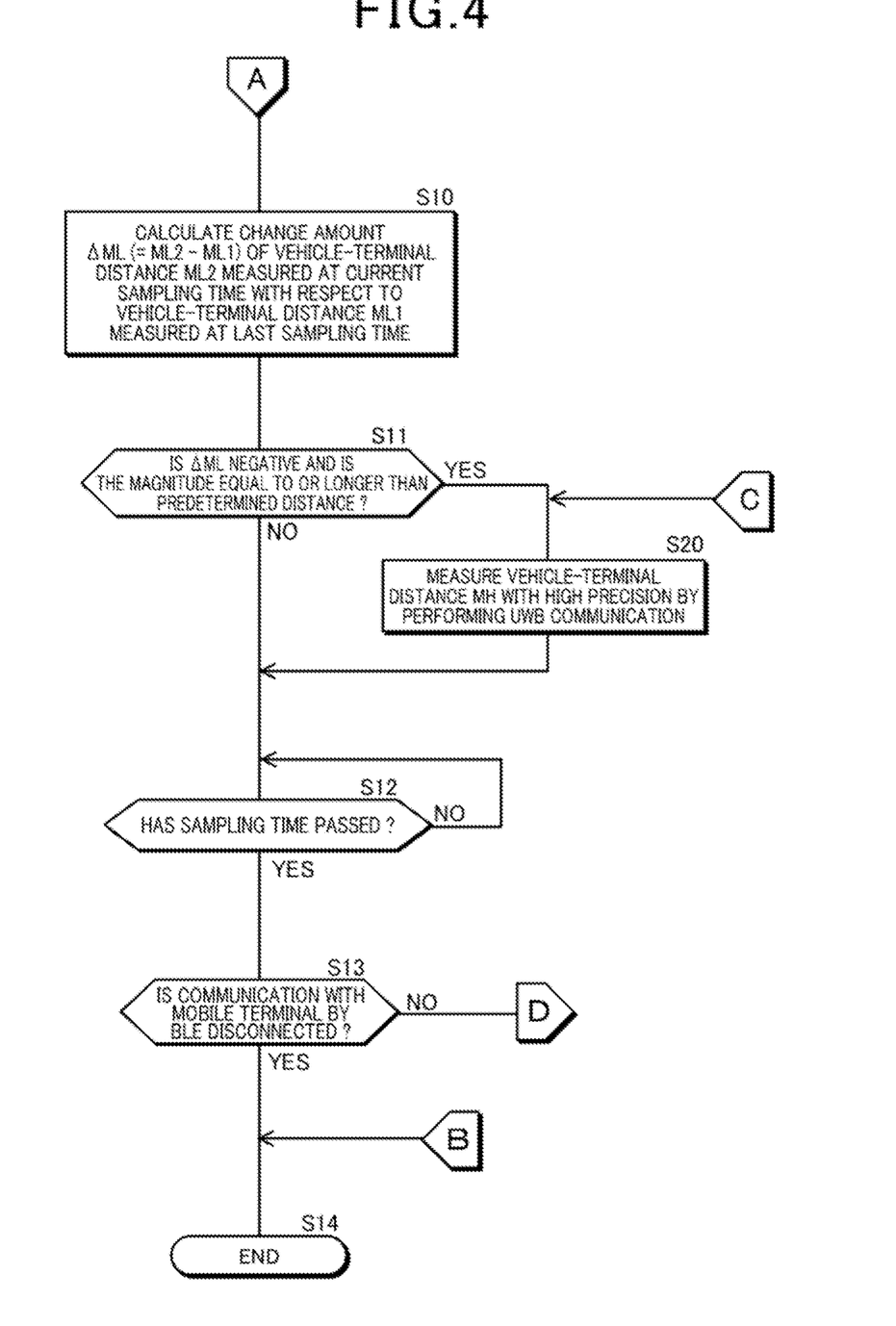
FIG. 4 is a second flowchart of the distance measurement processing between the vehicle and the mobile terminal.

With reference to the flowcharts shown in FIGS. 3 and 4, processing for measuring a distance between the vehicle and the mobile terminal to be executed by the vehicle control apparatus 110 is described.

In step S1 in FIG. 3, the vehicle communication control unit 111 performs polling by BLE and performs pairing processing with the mobile terminal 10 positioning within the out-vehicle communication area Ar1 (see FIG. 1) of the first vehicle communication unit 130. In the subsequent step S2, when communication with the mobile terminal 10 by BLE is established by the pairing processing with the mobile terminal 10, the vehicle communication control unit 111 advances the processing to step S3.

The vehicle communication control unit 111 transmits a polling signal through the first vehicle communication unit 130 and receives, through the first vehicle communication unit 130, a response signal transmitted from the mobile terminal 10 having received the polling signal and thus detects the mobile terminal 10 and performs pairing with the mobile terminal 10. As the procedure of the pairing, the polling signal may be transmitted from the mobile terminal 10, and a response signal transmitted from the vehicle 100 having received the polling signal may be received by the mobile terminal 10 to perform pairing between the vehicle 100 and the mobile terminal 10.

The battery remaining-amount recognizing unit 116 in step S3 recognizes the remaining amount of the battery 160, and the high-precision distance measurement determining unit 118 in the subsequent step S4 determines whether the remaining amount of the battery 160 is equal to or lower than a predetermined remaining amount or not (the third condition described above). If the remaining amount of the battery 160 is equal to or lower than the predetermined remaining amount, the high-precision distance measurement determining unit 118 advances the processing to step S14 in FIG. 4, and, in this case, the measurement of the vehicle-terminal distance M by the first distance measuring unit 114 is inhibited. On the other hand, if the remaining amount of the battery 160 is higher than the predetermined remaining amount, the high-precision distance measurement determining unit 118 advances the processing to step S5.

In step S5, the electronic-key-app operation recognizing unit 117 requests the mobile terminal 10 to transmit the operating state information Sci by BLE communication and obtains the operating state information Sci transmitted from the mobile terminal 10 in response to the request. Then, the electronic-key-app operation recognizing unit 117 recognizes whether the electronic key app 30 is in operation in the mobile terminal 10 or not from the operating state information Sci.

In the subsequent step S6, the high-precision distance measurement determining unit 118 determines whether the electronic-key-app operation recognizing unit 117 recognizes that the electronic key app 30 is in operation in the mobile terminal 10 or not. If it is recognized that the electronic key app 30 is in operation in the mobile terminal 10, the high-precision distance measurement determining unit 118 advances the processing to step S20 in FIG. 4. In this case, the first distance measuring unit 114 measures the vehicle-terminal distance M with the first precision by performing UWB communication with the mobile terminal 10 in step S20, and the processing then moves to step S12. Hereinafter, the vehicle-terminal distance M measured with the first precision by the first distance measuring unit 114 is also called "vehicle-terminal distance MH".

On the other hand, if it is not recognized that the electronic key app 30 is in operation in the mobile terminal 10, the high-precision distance measurement determining unit 118 advances the processing from step S6 to step S7. In step S7, the terminal position information obtaining unit 113 requests the mobile terminal 10 to transmit the terminal position information Spi by BLE communication and obtains the terminal position information Spi transmitted from the mobile terminal 10 in response to the request.

In the subsequent step S8, the vehicle position information obtaining unit 112 obtains the vehicle position information Cpi including detection information on the current position of the vehicle 100 output from the GPS sensor 145. In the next step S9, the second distance measuring unit 115 measures the vehicle-terminal distance M with the second precision based on the current position of the mobile terminal 10 recognized from the terminal position information Spi and the current position of the vehicle 100 recognized from the vehicle position information Cpi. Hereinafter, the vehicle-terminal distance M measured by the second distance measuring unit 115 is also called "vehicle-terminal distance ML". The second distance measuring unit 115 saves, in the memory 120, the data of the vehicle-terminal distance ML measured in step S9.

In the subsequent step S10 in FIG. 4, the high-precision distance measurement determining unit 118 calculates a change amount ΔML (=ML2−ML1) of the vehicle-terminal distance ML2 measured at the current sampling time with respect to the vehicle-terminal distance ML1 measured at the last sampling time with reference to the time-series data of the vehicle-terminal distance ML measured by the second distance measuring unit 115 and saved in the memory 120.

In the next step S11, the high-precision distance measurement determining unit 118 determines whether the change amount ΔML is negative and the magnitude is equal to or higher than a predetermined value or not. If the change amount ΔML is negative and the magnitude is equal to or higher than the predetermined value, the high-precision distance measurement determining unit 118 advances the processing to step S20. In this case, as described above, the vehicle-terminal distance MH is measured with the first precision by the first distance measuring unit 114.

On the other hand, if the change amount ΔML is positive and the user U carrying the mobile terminal 10 is moving away from the vehicle 100, or if the magnitude of the change amount ΔML is lower than the predetermined value and it is recognized that the user U carrying the mobile terminal 10 is staying still, the high-precision distance measurement determining unit 118 advances the processing from step S11 to step S12. In this case, the measurement of the vehicle-terminal distance MH by the first distance measuring unit 114 is not performed.

In step S12, the high-precision distance measurement determining unit 118 waits for the passage of the sampling time and then advances the processing to step S13. In step S13, the vehicle communication control unit 111 determines whether the BLE communication between the first vehicle communication unit 130 and the mobile terminal 10 has been disconnected or not. If the BLE communication between the first vehicle communication unit 130 and the mobile terminal 10 has been disconnected, the vehicle communication control unit 111 then advances the processing to step S14 where the processing by the flowcharts in FIGS. 3 and 4 ends.

On the other hand, if the BLE communication between the first vehicle communication unit 130 and the mobile terminal 10 is being established, the vehicle communication control unit 111 advances the processing to step S3 in FIG. 3, and, in this case, the processing in step S3 and subsequent steps is repeatedly executed, and whether the measurement of the vehicle-terminal distance MH with the first precision by the first distance measuring unit 114 is to be performed or not is determined by the high-precision distance measurement determining unit 118.

4. Other Embodiments

Although, in the embodiment above, the high-precision distance measurement determining unit 118 determines the satisfaction of the first to third conditions, the determination of the satisfaction of the second and third conditions may be omitted.

Although, in the embodiment above, the vehicle position information obtaining unit 112 is provided and the vehicle position information Cpi is obtained by the vehicle GPS sensor 145, information on a parking point of the vehicle 100 (point where use of the vehicle 100 starts) may be included in the terminal position information Spi which may then be transmitted to the vehicle 200 if the user U recognizes the parking point of the vehicle 100. In this case, the vehicle position Information obtaining unit 112 obtains vehicle position information including current position information of the vehicle from the terminal position information Spi. The vehicle position information obtaining unit 112 may obtain vehicle position information including current position information on the vehicle 100 by obtaining a position signal output from a beacon placed at a parking location of the vehicle 100.

Although, in the embodiment above, the second distance measuring unit 115 measures the vehicle-terminal distance MH with the first precision by performing UWB communication between the second vehicle communication unit 140 and the mobile terminal 10, the vehicle-terminal distance MH may be measured with the first precision by other measurement methods.

FIGS. 1 and 2 are schematic diagrams showing the configuration of the vehicle control apparatus 110 by dividing it based on main processing details for easy understanding of the present invention of the subject application, but the vehicle control apparatus 110 may be configured based on other divisions. Processing by the constituent elements may be executed by one hardware unit or may be executed by a plurality of hardware units. The processing by the constituent elements shown in FIGS. 3 and 4 may be executed by one program or may be executed by a plurality of programs.

5. Configuration Supported by Embodiments Above

The embodiments above are specific examples of the following configuration.

(1) A vehicle control apparatus including a vehicle communication control unit performing communication by a first communication specification with a mobile terminal used by a user of a vehicle when the mobile terminal positions within an out-vehicle communication area within a predetermined distance from the vehicle, a first distance measuring unit measuring a vehicle-terminal distance with first precision, the vehicle-terminal distance being a distance between the vehicle and the mobile terminal, a vehicle position information obtaining unit obtaining vehicle position information including current position information on the vehicle, a terminal position information obtaining unit obtaining terminal position information including current position information on the mobile terminal transmitted from the mobile terminal by the first communication specification by receiving the terminal position information from the mobile terminal through the vehicle communication control unit, a second distance measuring unit measuring the vehicle-terminal distance with second precision based on the vehicle position information and the terminal position information, the second precision being measurement precision lower than the first precision, and a high-precision distance measurement determining unit determining whether the first distance measuring unit is caused to measure the vehicle-terminal distance or not based on the vehicle-terminal distance measured by the second distance measuring unit.

According to the vehicle control apparatus under (1), when the mobile terminal positions within an out-vehicle communication area and communication is performed by the first communication specification between the mobile terminal and the vehicle communication control unit, a vehicle-terminal distance is measured, by the second distance measuring unit, with low precision based on terminal position information transmitted from the mobile terminal. The high-precision distance measurement determining unit determines whether the first distance measuring unit is caused to measure the vehicle-terminal distance with first precision being high precision or not based on the vehicle-terminal distance measured by the second distance measuring unit. Thus, the power consumption required for measurement of the vehicle-terminal distance can be reduced more than a case where the vehicle-terminal distances are unconditionally measured with the high precision by the first distance measuring unit when the mobile terminal positions within the out-vehicle communication area.

(2) The vehicle control apparatus according to (1), wherein the high-precision distance measurement determining unit determines to cause the first distance measuring unit to measure the vehicle-terminal distance when the vehicle-terminal distance decreases by a predetermined distance or larger in a plurality of the vehicle-terminal distances measured at different points in time by the second distance measuring unit.

According to the vehicle control apparatus under (2), when it is presumed from a measurement state by the second distance measuring unit that a user carrying the mobile terminal is approaching the vehicle for using the vehicle, the first distance measuring unit can be caused to measure the vehicle-terminal distance with the high precision.

(3) The vehicle control apparatus under (2), further including a battery remaining-amount recognizing unit recognizing a remaining amount of a battery included in the vehicle, wherein the high-precision distance measurement determining unit determines not to cause the first distance measuring unit to measure the vehicle-terminal distance when the remaining amount of the battery recognized by the battery remaining-amount recognizing unit is equal to or lower than a predetermined remaining amount even though the vehicle-terminal distance decreases by a predetermined distance or larger in a plurality of the vehicle-terminal distances measured at different points in time by the second distance measuring unit.

According to the vehicle control apparatus under (3), when the remaining amount of the battery is low, the measurement of the vehicle-terminal distance by the first distance measuring unit is inhibited so that the decrease of the remaining amount of the battery can be reduced.

(4) The vehicle control apparatus under (2) or (3), further including an electronic-key-app operation recognizing unit recognizing that an electronic key app for remotely operating the vehicle with the mobile terminal is in operation based on operating state information on the mobile terminal transmitted from the mobile terminal to the vehicle communication control unit, wherein the high-precision distance measurement determining unit determines to cause the first distance measuring unit to measure the vehicle-terminal distance when the electronic-key-app operation recognizing unit recognizes that the electronic key app is in operation even though the vehicle-terminal distance does not decrease by a predetermined distance or larger in a plurality of the vehicle-terminal distances measured at different points in time by the second distance measuring unit.

According to the vehicle control apparatus under (4), when the electronic key app is in operation in the mobile terminal, it is presumed that there is a high possibility that the user uses the vehicle, and the first distance measuring unit can be caused to measure the vehicle-terminal distance with the high precision.

(5) The vehicle control apparatus according to any one of (1) to (4), wherein the terminal position information includes current position information on the mobile terminal detected by a terminal global positioning system (GPS) sensor provided in the mobile terminal, the vehicle position information includes current position information on the vehicle detected by a vehicle GPS sensor provided in the vehicle, the second distance measuring unit measures the vehicle-terminal distance with the second precision based on a current position of the vehicle detected by the vehicle GPS sensor and recognized from the vehicle position information and the terminal position information detected by the terminal GPS sensor and recognized from the terminal position information, and the first distance measuring unit measures the vehicle-terminal distance with the first precision by performing, by the vehicle communication control unit, communication with the mobile terminal by a second communication specification involving larger power consumption for communication than the first communication specification.

According to the vehicle control apparatus under (5), the second distance measuring unit measures the vehicle-terminal distance with the second precision based on current positions of the mobile terminal and the vehicle by the terminal GPS sensor and the vehicle GPS sensor where the precision of the position measurement may be decreased by communication between the mobile terminal and the vehicle by the first communication specification with lower power consumption for communication. Based on the vehicle-terminal distance by the second distance measuring unit, the high-precision distance measurement determining unit then determines whether the first distance measuring unit is caused to measure the vehicle-terminal distance or not by performing communication between the mobile terminal and the vehicle by the second communication specification with higher power consumption for communication than the first communication specification. Thus, the power consumption required for the measurement of the vehicle-terminal distance can be reduced more than a case where the vehicle-terminal distances are unconditionally measured by the first distance measuring unit.

(6) The vehicle control apparatus under (5), wherein the first communication specification is a communication specification by Bluetooth Low Energy (BLE), and the second communication specification is a communication specification by Ultra Wide Band (UWB).

According to the vehicle control apparatus under (6), the power consumption is reduced by performing BLE communication for the measurement of the vehicle-terminal distance by the second distance measuring unit and performing UWB communication for the measurement of the vehicle-terminal distance by the first distance measuring unit so that the vehicle-terminal distance can be measured with high precision.

(7) A vehicle control method to be executed by a vehicle control apparatus performing communication with a mobile terminal used by a user of a vehicle, the method including a vehicle communication control step of performing communication by a first communication specification with the mobile terminal when the mobile terminal positions within an out-vehicle communication area within a predetermined distance from the vehicle, a first distance measuring step of measuring a vehicle-terminal distance with first precision, the vehicle-terminal distance being a distance between the vehicle and the mobile terminal, a vehicle position information obtaining step of obtaining vehicle position information including current position information on the vehicle, a terminal position information obtaining step of obtaining terminal position information including current position information on the mobile terminal transmitted from the mobile terminal by the first communication specification by receiving the terminal position information from the mobile terminal through processing in the vehicle communication control step, a second distance measuring step of measuring the vehicle-terminal distance with second precision based on the vehicle position information and the terminal position information, the second precision being measurement precision lower than the first precision, and a high-precision distance measurement determining step of determining whether the first distance measuring step is caused to measure the vehicle-terminal distance or not based on the vehicle-terminal distance measured in the second distance measuring step.

By executing the vehicle control method under (7) by the vehicle control apparatus, the configuration of the vehicle control apparatus under (1) above can be implemented.

(8) A recording medium with a program for control recorded, the program being executed by a vehicle control apparatus performing communication with a mobile terminal used by a user of a vehicle and causing the vehicle control apparatus to function as a vehicle communication control unit performing communication by a first communication specification with the mobile terminal when the mobile terminal positions within an out-vehicle communication area within a predetermined distance from the vehicle, a first distance measuring unit measuring a vehicle-terminal distance with first precision, the vehicle-terminal distance being a distance between the vehicle and the mobile terminal, a vehicle position information obtaining unit obtaining vehicle position information Including current position information on the vehicle, a terminal position information obtaining unit obtaining terminal position information including current position information on the mobile terminal transmitted from the mobile terminal by the first communication specification by receiving the terminal position information from the mobile terminal through the vehicle communication control unit, a second distance measuring unit measuring the vehicle-terminal distance with second precision based on the vehicle position information and the terminal position information, the second precision being measurement precision lower than the first precision, and a high-precision distance measurement determining unit determining whether the first distance measuring unit is caused to measure the vehicle-terminal distance or not based on the vehicle-terminal distance measured by the second distance measuring unit.

By executing the program for control under (8) by the vehicle control apparatus, the configuration of the vehicle control apparatus under (1) above can be implemented.

(9) A vehicle control system including a vehicle control apparatus having a vehicle communication control unit and a mobile terminal used by a user of a vehicle, wherein the vehicle communication control unit and the mobile terminal perform communication by a first communication specification by establishing communication with each other when the mobile terminal positions within an out-vehicle communication area within a predetermined distance from the vehicle, and the vehicle control apparatus includes a first distance measuring unit measuring a vehicle-terminal distance with first precision, the vehicle-terminal distance being a distance between the vehicle and the mobile terminal, a vehicle position information obtaining unit obtaining vehicle position information including current position information on the vehicle, a terminal position information obtaining unit obtaining terminal position information including current position information on the mobile terminal transmitted from the mobile terminal by the first communication specification by receiving the terminal position information from the mobile terminal through the vehicle communication control unit, a second distance measuring unit measuring the vehicle-terminal distance with second precision based on the vehicle position information and the terminal position information, the second precision being measurement precision lower than the first precision, and a high-precision distance measurement determining unit determining whether the first distance measuring unit is caused to measure the vehicle-terminal distance or not based on the vehicle-terminal distance measured by the second distance measuring unit.

According to the vehicle control system under (9), when the mobile terminal positions within an out-vehicle communication area of the vehicle communication control unit and communication is established by the first communication specification between the mobile terminal and the vehicle communication control unit, a vehicle-terminal distance is measured, by the second distance measuring unit, with low precision based on terminal position information transmitted from the mobile terminal. The high-precision distance measurement determining unit determines whether the first distance measuring unit is caused to measure the vehicle-terminal distance with first precision being high precision or not based on the vehicle-terminal distance measured by the second distance measuring unit. Thus, the power consumption required for measurement of the vehicle-terminal distance can be reduced more than a case where the vehicle-terminal distances are unconditionally measured with the high precision by the first distance measuring unit when the mobile terminal positions within the out-vehicle communication area.

REFERENCE SIGNS LIST

1: vehicle control system, 10: mobile terminal, 20: terminal GPS sensor, 30: electronic key app, 100: vehicle, 110: vehicle control apparatus, 111: vehicle communication control unit, 112: vehicle position information obtaining unit, 113: terminal position information obtaining unit, 114: first distance measuring unit, 115: second distance measuring unit, 116: battery remaining-amount recognizing unit, 117: electronic-key-app operation recognizing unit, 118: high-precision distance measurement determining unit, 120: memory, 121: program for control, 130: first vehicle communication unit, 131: BLE antenna, 140: second vehicle communication unit, 141, 142, 143: UWB antenna, 145: vehicle GPS sensor, 160: battery, U: user

What is claimed is:

1. A vehicle control apparatus comprising a CPU (central processing unit) that includes:
    a vehicle communication control unit performing communication by a first communication specification with a mobile terminal used by a user of a vehicle when the mobile terminal positions within an out-vehicle communication area within a predetermined distance from the vehicle;
    a first distance measuring unit measuring a vehicle-terminal distance with first precision, the vehicle-terminal distance being a distance between the vehicle and the mobile terminal;
    a vehicle position information obtaining unit obtaining vehicle position information including current position information on the vehicle;
    a terminal position information obtaining unit obtaining terminal position information including current position information on the mobile terminal transmitted from the mobile terminal by the first communication specification by receiving the terminal position information from the mobile terminal through the vehicle communication control unit;
    a second distance measuring unit measuring the vehicle-terminal distance with second precision based on the vehicle position information and the terminal position information, the second precision being measurement precision lower than the first precision;
    a high-precision distance measurement determining unit determining whether the first distance measuring unit is caused to measure the vehicle-terminal distance or not based on the vehicle-terminal distance measured by the second distance measuring unit, and determining to cause the first distance measuring unit to measure the vehicle-terminal distance when the vehicle-terminal distance decreases by a predetermined distance or larger in a plurality of the vehicle-terminal distances measured at different points in time by the second distance measuring unit; and
    an electronic-key-app operation recognizing unit recognizing that an electronic key app for remotely operating the vehicle with the mobile terminal is in operation based on operating state information on the mobile terminal transmitted from the mobile terminal to the vehicle communication control unit, wherein the high-precision distance measurement determining unit determines to cause the first distance measuring unit to measure the vehicle-terminal distance when the electronic-key-app operation recognizing unit recognizes that the electronic key app is in operation even though the vehicle-terminal distance does not decrease by a predetermined distance or larger in a plurality of the vehicle-terminal distances measured at different points in time by the second distance measuring unit.

2. The vehicle control apparatus according to claim 1, wherein the CPU further includes a battery remaining-amount recognizing unit recognizing a remaining amount of a battery included in the vehicle, the high-precision distance measurement determining unit determines not to cause the first distance measuring unit to measure the vehicle-terminal distance when the remaining amount of the battery recognized by the battery remaining-amount recognizing unit is equal to or lower than a predetermined remaining amount even though the vehicle-terminal distance decreases by a predetermined distance or larger in a plurality of the vehicle-terminal distances measured at different points in time by the second distance measuring unit.

3. The vehicle control apparatus according to claim 1, wherein the terminal position information includes current position information on the mobile terminal detected by a terminal global positioning system (GPS) sensor provided in the mobile terminal, the vehicle position information includes current position information on the vehicle detected by a vehicle GPS sensor provided in the vehicle, the second distance measuring unit measures the vehicle-terminal distance with the second precision based on a current position of the vehicle detected by the vehicle GPS sensor and recognized from the vehicle position information and the terminal position information detected by the terminal GPS sensor and recognized from the terminal position information, and the first distance measuring unit measures the vehicle-terminal distance with the first precision by performing, by the vehicle communication control unit, communication with the mobile terminal by a second communication specification involving larger power consumption for communication than the first communication specification.

4. The vehicle control apparatus according to claim 3, wherein the first communication specification is a communication specification by Bluetooth Low Energy (BLE), and the second communication specification is a communication specification by Ultra Wide Band (UWB).

5. A vehicle control method to be executed by a vehicle control apparatus performing communication with a mobile terminal used by a user of a vehicle, the method comprising:

a vehicle communication control step of performing communication by a first communication specification with the mobile terminal when the mobile terminal positions within an out-vehicle communication area within a predetermined distance from the vehicle;

a first distance measuring step of measuring a vehicle-terminal distance with first precision, the vehicle-terminal distance being a distance between the vehicle and the mobile terminal;

a vehicle position information obtaining step of obtaining vehicle position information including current position information on the vehicle;

a terminal position information obtaining step of obtaining terminal position information including current position information on the mobile terminal transmitted from the mobile terminal by the first communication specification by receiving the terminal position information from the mobile terminal through processing in the vehicle communication control step;

a second distance measuring step of measuring the vehicle-terminal distance with second precision based on the vehicle position information and the terminal position information, the second precision being measurement precision lower than the first precision;

a high-precision distance measurement determining step of determining whether the first distance measuring step is caused to measure the vehicle-terminal distance or not based on the vehicle-terminal distance measured in the second distance measuring step, and determining to cause the first distance measuring step to measure the vehicle-terminal distance when the vehicle-terminal distance decreases by a predetermined distance or larger in a plurality of the vehicle-terminal distances measured at different points in time by the second distance measuring step; and an electronic-key-app operation recognizing step recognizing that an electronic key app for remotely operating the vehicle with the mobile terminal is in operation based on operating state information on the mobile terminal transmitted from the mobile terminal to the vehicle control apparatus, wherein the high-precision distance measurement determining step determines to cause the first distance measuring step to measure the vehicle-terminal distance when the electronic-key-app operation recognizing step recognizes that the electronic key app is in operation even though the vehicle-terminal distance does not decrease by a predetermined distance or larger in a plurality of the vehicle-terminal distances measured at different points in time by the second distance measuring step.

6. A non-transitory computer readable recording medium with a program for control recorded, the program being executed by a vehicle control apparatus performing communication with a mobile terminal used by a user of a vehicle and causing the vehicle control apparatus to function as:

a vehicle communication control unit performing communication by a first communication specification with the mobile terminal when the mobile terminal positions within an out-vehicle communication area within a predetermined distance from the vehicle;

a first distance measuring unit measuring a vehicle-terminal distance with first precision, the vehicle-terminal distance being a distance between the vehicle and the mobile terminal;

a vehicle position information obtaining unit obtaining vehicle position information including current position information on the vehicle;

a terminal position information obtaining unit obtaining terminal position information including current position information on the mobile terminal transmitted from the mobile terminal by the first communication specification by receiving the terminal position information from the mobile terminal through the vehicle communication control unit;

a second distance measuring unit measuring the vehicle-terminal distance with second precision based on the vehicle position information and the terminal position information, the second precision being measurement precision lower than the first precision;

a high-precision distance measurement determining unit determining whether the first distance measuring unit is caused to measure the vehicle-terminal distance or not based on the vehicle-terminal distance measured by the second distance measuring unit, and determining to cause the first distance measuring unit to measure the vehicle-terminal distance when the vehicle-terminal distance decreases by a predetermined distance or larger in a plurality of the vehicle-terminal distances measured at different points in time by the second distance measuring unit; and an electronic-key-app operation recognizing unit recognizing that an electronic key app for remotely operating the vehicle with the mobile terminal is in operation based on operating state information on the mobile terminal transmitted from the mobile terminal to the vehicle communication control unit, wherein the high-precision distance measurement determining unit determines to cause the first distance measuring unit to measure the vehicle-terminal distance when the electronic-key-app operation recognizing unit recognizes that the electronic key app is in operation even though the vehicle-terminal distance does not decrease by a predetermined distance or larger in a plurality of the vehicle-terminal distances measured at different points in time by the second distance measuring unit.

7. A vehicle control system comprising a vehicle control apparatus having a vehicle communication control unit and a mobile terminal used by a user of a vehicle, wherein the vehicle communication control unit and the mobile terminal perform communication by a first communication specification by establishing communication with each other when the mobile terminal positions within an out-vehicle communication area within a predetermined distance from the vehicle, and the vehicle control apparatus includes a CPU (central processing unit) that includes:

a first distance measuring unit measuring a vehicle-terminal distance with first precision, the vehicle-terminal distance being a distance between the vehicle and the mobile terminal;

a vehicle position information obtaining unit obtaining vehicle position information including current position information on the vehicle;

a terminal position information obtaining unit obtaining terminal position information including current position information on the mobile terminal transmitted from the mobile terminal by the first communication specification by receiving the terminal position information from the mobile terminal through the vehicle communication control unit;

a second distance measuring unit measuring the vehicle-terminal distance with second precision based on the vehicle position information and the terminal position information, the second precision being measurement precision lower than the first precision;

a high-precision distance measurement determining unit determining whether the first distance measuring unit is caused to measure the vehicle-terminal distance or not based on the vehicle-terminal distance measured by the second distance measuring unit, and determining to cause the first distance measuring unit to measure the vehicle-terminal distance when the vehicle-terminal distance decreases by a predetermined distance or larger in a plurality of the vehicle-terminal distances measured at different points in time by the second distance measuring unit; and an electronic-key-app operation recognizing unit recognizing that an electronic key app for remotely operating the vehicle with the mobile terminal is in operation based on operating state information on the mobile terminal transmitted from the mobile terminal to the vehicle communication control unit, wherein the high-precision distance measurement determining unit determines to cause the first distance measuring unit to measure the vehicle-terminal distance when the electronic-key-app operation recognizing unit recognizes that the electronic key app is in operation even though the vehicle-terminal distance does not decrease by a predetermined distance or larger in a plurality of the vehicle-terminal distances measured at different points in time by the second distance measuring unit.

8. A vehicle control apparatus comprising a CPU (central processing unit) that includes:

a vehicle communication control unit performing communication by a first communication specification with a mobile terminal used by a user of a vehicle when the mobile terminal positions within an out-vehicle communication area within a predetermined distance from the vehicle;

a first distance measuring unit measuring a vehicle-terminal distance with first precision, the vehicle-terminal distance being a distance between the vehicle and the mobile terminal;

a vehicle position information obtaining unit obtaining vehicle position information including current position information on the vehicle;

a terminal position information obtaining unit obtaining terminal position information including current position information on the mobile terminal transmitted from the mobile terminal by the first communication specification by receiving the terminal position information from the mobile terminal through the vehicle communication control unit;

a second distance measuring unit measuring the vehicle-terminal distance with second precision based on the vehicle position information and the terminal position information, the second precision being measurement precision lower than the first precision;

a high-precision distance measurement determining unit determining whether the first distance measuring unit is caused to measure the vehicle-terminal distance or not based on the vehicle-terminal distance measured by the second distance measuring unit, and determining to cause the first distance measuring unit to measure the vehicle-terminal distance when the vehicle-terminal distance decreases by a predetermined distance or larger in a plurality of the vehicle-terminal distances measured at different points in time by the second distance measuring unit; and a battery remaining-amount recognizing unit recognizing a remaining amount of a battery included in the vehicle, wherein the high-precision distance measurement determining unit determines not to cause the first distance measuring unit to measure the vehicle-terminal distance when the remaining amount of the battery recognized by the battery remaining-amount recognizing unit is equal to or lower than a predetermined remaining amount even though the vehicle-terminal distance decreases by a predetermined distance or larger in a plurality of the vehicle-terminal distances measured at different points in time by the second distance measuring unit.

* * * * *